United States Patent [19]

Jackson

[11] Patent Number: 5,344,493
[45] Date of Patent: Sep. 6, 1994

[54] CLEANING PROCESS USING MICROWAVE ENERGY AND CENTRIFUGATION IN COMBINATION WITH DENSE FLUIDS

[76] Inventor: David P. Jackson, 608 Ruberta, Glendale, Calif. 91201

[21] Appl. No.: 915,321

[22] Filed: Jul. 20, 1992

[51] Int. Cl.$^5$ ............................................... B08B 3/12
[52] U.S. Cl. ......................................... 134/1; 134/2; 134/21; 134/31; 134/33; 204/158.2; 204/158.21
[58] Field of Search ................... 134/1, 2, 21, 31, 33

[56] References Cited

U.S. PATENT DOCUMENTS 4,718,974  1/1988  Minaee ............................ 156/643
5,013,366  5/1991  Jackson et al. ...................... 134/2

Primary Examiner—José G. Dees
Assistant Examiner—Dwayne C. Jones
Attorney, Agent, or Firm—Roger A. Marrs

[57] ABSTRACT

An environmentally safe process for cleaning substrates used in critical environments with stringent end-product cleanliness requirements in a single process using microwave-energized and centrifuged dense fluids. One or more dense fluids are mixed with one or more chemical or physical agents and are simultaneously subjected to microwave radiation and centrifugal force to remove deeply recessed contaminants from internal and external surfaces of intricately arranged or formulated substrates such as biomaterials, spent activated carbon, elastomerics, surgical aids, or dental implants. Subsequently, cleaned substrates are simultaneously subjected to microwave radiation and centrifugal force under vacuum to remove residual volatile contaminants. Additionally, the cleaned and sterilized substrates are contacted with chemical or physical agents to provide enhanced cleaning and to provide new and improved substrate properties such as increased electrical insulation, conductivity, or biocompatibility. Finally, the entire process is performed on substrates which are prepackaged in semi-permeable membranes, preventing recontamination of the cleaned substrates.

25 Claims, 6 Drawing Sheets

CLEANING PROCESS USING MICROWAVE ENERGY AND CENTRIFUGATION IN COMBINATION WITH DENSE FLUIDS

BACKGROUND OF THE INVENTION

1. Field of the Invention

The present invention relates generally to the use of liquified and supercritical gases, hereafter described as dense fluids, for cleaning substrates. More particularly, the present invention relates to a process of using microwave energy in combination with dense fluids or dense fluid solvent mixtures and centrifugal force to simultaneously clean a variety of inorganic and organic substrates, including biomaterials and hazardous wastes, to prepare said substrates for use in biological, high energy, high vacuum, high temperature, or high pressure systems and applications or, in the application of cleaning (decontaminating) hazardous wastes, to prepare said substrates for reuse or for safe disposal. Cleaning in the present invention is defined as removing one or more contaminants from a substrate. More specifically, cleaning substrates using the processes of the present invention is defined as a process of removing one or more contaminants from a contaminated or impure substrate to produce a clean or pure substrate exhibiting improved chemical or physical properties such as increased visual cleanliness, improved electrical insulation, lower thermal outgassing, or biological cleanliness (sterility), among other improved characteristics. In addition, the processes and exemplary devices of the present invention are useful for detoxifying hazardous materials such as spent activated carbon or to enhance conventional supercritical fluid extraction processes such as the extraction of scents and oils from botannicals. The terms 'sterilization', 'substrate engineering', 'preservation', 'extraction', 'separation', and 'detoxification' are used in this patent declaration and are regarded as cleaning.

2. Description of Related Art

Conventional substrate cleaning processes using hazardous organic solvents, toxic gases, radiation, and topical biocides are currently being re-evaluated due to problems with environmental pollution, toxicity, inefficiency, or poor performance. The use of toxic, carcinogenic, or mutagenic substances to achieve sterility have been shown to be deleterious to the environment, pose significant health threats (D. Lynch, et al, "Effects on Monkeys and Rats of Long-Term Inhalation of Ethylene Oxide: Major Findings of the NIOSH Study", AAMI, 1984), require strict control, and create hazardous waste disposal problems. Also, conventional cleaning processes may damage or alter substrate performance properties. For example, steam autoclaving may greatly accelerate oxide growth on titanium biomaterials (J. Lausmaa, et al, "Accelerated Oxide Growth on Titanium Implants During Autoclaving caused by Fluorine Contamination", *BIOMATERIALS*, Volume 6, January 1985) and must be carefully controlled.

In some cases, the cleaning media chemically reacts with interstitial substrate residues to form harmful by-products. For example, toxic-by-products or residual media left on biomedical substrates following conventional cleaning processes using ethylene oxide gas have been shown to adversely impact implant performance (H. Scherer, et al, "Hazards Related to Gas Sterilized Materials, *LARYNG. RHINOL, OTOL.*, 65, 1986).

Additionally, conventional biomaterial substrate preparation processes require a separate pre-cleaning operation prior to sterilization operations to assure complete substrate sterility. For example, in ultraviolet (UV) disinfection processes, bacterial shadowing by substrate structures, cavities, or other contaminants are a great concern (R. Boylan, et al, "Evaluation of an Ultraviolet Disinfection Unit", *THE JOURNAL OF PROSTHETIC DENTISTRY*, Volume 58, Number 5, November 1987). Since ultraviolet treatment is generally only effective on line-of-sight substrate sterilization applications, complex substrates with intricate geometries must be scrupulously cleaned using conventional cleaning techniques prior to UV sterilization.

Finally, conventional cleaning processes are often performed as separate operations, involving the immersion of, or the application of topical sterilants, disinfectants, and other chemical agents. For example, several physical and chemical sterilization methods are used in industry. These methods include gamma radiation treatment (Ch. Baquey, et al, "Radiosterilization of Albuminated Polyester Prostheses", *BIOMATERIALS* Volume 8, May 1987), ultraviolet radiation, steam autoclaving, dry heat, and toxic gas sterilization (*MICROBIOLOGY*, M. Peczar, et al, McGraw-Hill Publishers, 1977, pp 425–423).

Substrates used for biomedical, aerospace, high energy, and high vacuum applications are fabricated from different types of materials having various internal and external geometries. These may be assembled biomedical devices such as medical implants, valves, or artificial joints, or they may be surgical aids such as sponges, tubing, guidewires, and clips, and may be contaminated with more than one type of inorganic, organic, or biological contaminant. These highly complex substrates require precision cleaning prior to use in critical environments such as the human body. Often, assembled devices must be disassembled to accommodate conventional cleaning processes.

Polymeric substrates used in surgical applications, or biomaterials, must be free of organic and inorganic residues and microbiological contaminants to provide maximum biologic adhesiveness (cellular adhesion) and no biologic reactivity (biocompatibility). These substrates must be capable of performing their intended function over prolonged periods in contact with living tissue and body fluids. This is a highly specialized environment of great biochemical complexity. The principle medical uses of polymers include: structural materials, joint replacements, dental materials, medical devices (including tubing for transport of biofluids both inside and outside biological systems), adhesives, and sutures. Residual moisture, monomers, oils, plasticizers, dyes, pigments, and other additives contained on or in unclean substrates can produce harmful side effects such as toxic chemical release through bioreaction, infection, swelling, or complete implant rejection.

Substrates having polymeric composition such as spacecraft electrical wiring, electronic connectors, and gasketing must meet strigent NASA outgassing performance requirements ("Vacuum Stability Requirements of Polymeric Materials for Spacecraft Application", SP-R-0022A). Interstitial contaminants such as moisture, plasticizers, and oils, if not removed, volatilize under conditions of high vacuum or high temperature. These contaminants migrate from substrate cavities and deposit on adjacent surfaces, causing system functional problems such as dielectric loss, changes in optical transmission or reflection characteristics, and thermal transfer changes, among others.

Because conventional substrate cleaning processes are performed as independent steps, often the cleaning procedure re-contaminates the substrate with residues or adversely affects the physical properties and subsequent performance of the bulk material (J. Doundoulakis, D. M. D., "Surface Analysis of Titanium after Sterilization Role in Implant-Tissue Interface and Bioadhesion", THE JOURNAL OF PROSTHETIC DENTISTRY, Volume 58, Number 4, October 1987).

Additionally, conventional sterilization processes only deactivate biological contaminants and do not remove these deactivated residues from the substrate. These residues have been shown to adversely affect the performance of biomaterials following implant operations.

Additionally, conventional cleaning processes are effective only on external surfaces of composite or intricately arranged substrates and provide little or no internal cleaning and sterilization capability. In implant cleaning applications, it is imperative that both external and internal surfaces of substrates be both chemically and biologically clean.

Conventional substrate cleaning processes rely on methods employing hazardous organic cleaning solvents such as isopropyl alcohol (Hohmann et al, "Method and Apparatus for Cleaning, Disinfecting and Sterilizing Medical Instruments" U.S. Pat. No. 4,710,233, Dec. 1, 1987), chlorinated hydrocarbons, and other toxic and flammable compounds. Also, many conventional cleaning agents and processes are generally not chemically compatible with organic materials such as spices and herbs, only clean external surfaces, and do not provide a means of extending the cleanliness of the material once following processing. Additionally, this patent applies to metal tools, and it does provide for the removal of residual sterilizing agents from substrates.

In another example of known art using supercritical fluids as washing agents (Nishikawa et al, "Method of Processing an Article in a Supercritical Atmosphere", U.S. Pat. No. 4,944,837, Jul. 31, 1990), a material is cleaned in a supercritical atmosphere to prepare the material for resist stripping using a supercritical fluid or an admixture solvent. Our research shows that non-energized mono-phasic supercritical fluids are poor cleaning solvents for many typical contaminant removal or chemical agent implant applications. Firstly, a contaminant or chemical agent must be provided the proper solvent environment in order to be transported. This may involve employing one or more dense fluids, fluid states (liquid and supercritical) and chemical agent admixtures which is based upon knowledge of the solubility chemistries of the targeted contaminants or the chemical agents. Secondly, our research shows that adjunct higher energy is required to efficiently and effectively solubilize and transport contaminants from substrates, not provided for in this patent citation. Finally, this patent does not provide a means of altering the chemical or physical characteristics of the bulk substrates, and contaminants contained within said substrates, for utilization in critical environments where different bulk properties (internal and external characteristics) such as long-term sterility, improved ductility, or improved electrical insulation would be desirable or required.

Examples of known art (developed by the inventor of the processes of the present invention) using phase shifting of dense fluids (Jackson et al, "Cleaning Process Using Phase Shifting of Dense Phase Gases", U.S. Pat. No. 5,013,366, May 7, 1991) and photochemical action on dense fluids (Jackson, "Dense Phase Gas Photochemical Process for Substrate Treatment", U.S. Pat. No. 5,068,040, Nov. 26, 1991), a substrate and its unwanted residues are subjected to dense fluid chemistries that have been phase shifted via temperature (or pressure), or altered photochemically, to create the most suitable solvent environments (like-dissolves-like) for various contaminants on substrates. These processes employ ultrasonic energy, temperature and pressure control, and ultraviolet light singularly or in combination to simultaneously remove one or more contaminants from a substrate. These processes are based upon the action of externally applied energy (heat, fluid pressure, light, and sound energy) on the dense fluid to alter the dense fluid chemistry to effect separation of surface or subsurface contaminants from a substrate. Our research reveals that mechanisms and devices used to perform cleaning operations cited in these patents are not generally effective or efficient when processing bulk materials having different geometries such as connector pins and gaskets. The processes of the present invention provide superior methods for decontaminating substrates having various geometries by activating the unwanted contaminants deep within the substrate to facilitate transfer into the surrounding dense fluid environment and separation from the bulk material. The processes of the present invention are unique in that the applied energy source, microwave radiation, selectively activates surface and interstitial contaminants contained on or within substrates and only minimally interacts with the substrate (solid state) and dense cleaning fluids, including carbon dioxide and xenon (non-polar fluids). Alternatively, polar dense fluid mixtures consisting of, for example, 98% (by volume) liquified carbon dioxide and 2% (by volume) purified water or n-octyl alcohol may be used in conjunction with microwave energy. Microwave energy will be absorbed by the polar component of the dense fluid mixture, enhancing contaminant-removal or biocidal efficiency (n-octyl alcohol or hydrogen peroxide as biocides) in cleaning applications. Thus the processes of the present invention are used to activate the contaminants, the dense cleaning fluid(s), or both.

Finally, previously described known art using dense fluids as cleaning agents does not address the mechanical energy required to efficiently and effectively remove organic, inorganic, and biological contaminants from substrates. For example, mechanical agitation is mandatory in order to loosen and remove tenacious contaminants such as a oily particle matrix. This is particularly important in cleaning applications where bulk substrates are being processed, for example, hundreds of thousands of oily connector pins having various lengths and dead-end holes having entrapped particles and oils. In the known art related to the present invention, dense fluids or dense fluid mixtures are contacted with substrates. These processes require contact of said dense fluids with a substrate and solubilization of a contaminant. These processes are very inefficient because of the limited solute carrying capacity of dense fluids, due in part, to their low viscosity and density. This is particularly true with regards to cleaning bulk materials. To effectively clean bulk substrates such as ground or powdered botannicals, connector pins, machined parts, or other assemblies, the substrates must be evenly exposed to the dense fluid or dense fluid mixtures and energy sources, in this case microwave energy.

The processes of the present invention use a unique variable-speed basket centrifuge cleaning apparatus that provides the following; 1) homogenize the dense fluid cleaning solvent and 2) uniformly expose of the substrates to microwave energy and 3) provide centrifugal force to separate said contaminants from substrates and 4) provide multi-phase cleaning. Thus, the contaminated substrates are homogeneously mixed and contacted with the dense fluid cleaning agents and cleaning energies while be exposed with microwave and centrifugal energies.

Accordingly, there is a present need to provide more efficient and environmentally safer alternate substrate cleaning processes, having broader substrate cleaning applications, which are suitable for use in removing more than one type of contaminant from a variety substrates having complex geometries, densities, and volume.

SUMMARY OF THE INVENTION

The present invention provides a process for cleaning substrates to enhance both chemical and physical properties of said substrates for use in critical environments such as the food industry, space, aerospace, manufacturing, biomedical, high energy, or high vacuum. This invention provides methods for cleaning complex substrates such as composites and assemblies having various materials with intricate internal and external geometries and having bulk properties (3-dimensional and large quantity). Substrates may be prepackaged in semipermeable membranes, cleaned using the processes of the present invention, thus providing long-term protection.

Compared to conventional substrate cleaning processes, this invention offers advantages such as no toxicity, environmental compatibility, and much broader substrate cleaning applications. Compared to closest known art, this invention provides significant cleaning performance effectiveness and cleaning efficiency benefits, and is not dependent upon the bulking characteristics or quantity of substrates being processed. Additionally, the present invention provides an alternative to many conventional cleaning processes including degreasing, outgassing, extraction, sterilization, preservation, and substrate engineering processes, often performed as individual steps.

The above-discussed and many other features and other attendant advantages of the present invention will become better understood by reference to the following detailed description when considered in conjunction with the accompanying drawings.

DETAILED DESCRIPTION OF THE INVENTION

In the first embodiment of the present invention, undesired substances or 'contaminants' such as monomers, bacteria, and oils contained on and within a substrate, such as oily connector pins, gaskets, connector plugs, and polymerics are exposed to microwave (electromagnetic) energy fields while contained in a dense fluid or dense fluid mixture. The dense fluid or dense fluid mixtures may be chosen to absorb or not absorb microwave energy. The dense fluids suitable for use in the present process comprise either supercritical or near-supercritical liquified gases and chemical admixtures or agents dissolved in the dense fluid or dense fluid mixtures, and may be polar, nonpolar, or hydrogen bonding dense fluids or dense fluid mixtures. Unlike conventional solvents such as water, hexane, or isopropyl alcohol, dense fluids such as carbon dioxide and nitrous oxide exhibit unique chemistry such as variable solubility for a variety of substances, spontaneous wetting action, and powerful penetrating ability. A dense fluid is a gas or a mixture of gases compressed to supercritical, near-supercritical, or multi-phasic states to achieve liquid-state densities. The chemistry of dense fluids is well known.

Documented industrial applications utilizing dense fluids include extraction of oil from soybeans (J. Friedrich, et al, "Petroleum-Free Extracts of Oil from Soybeans", *JAOCS*, Volume 59, Number 7, July 1982), extraction of pyridines from coal (T. Squires, et al, "Supercritical Solvents. Carbon Dioxide Extraction of Retained Pyridine Extracts of Coal", FUEL, Volume 61, November 1982), extraction of flavorants from hops (R. Vollbrecht, "Extraction of Hops with Supercritical Carbon Dioxide", *Chemistry and Industry*, Jun. 19, 1982), and regenerating adsorbents (M. Modell, "Process for Regenerating Adsorbents with Supercritical Fluids", U.S. Pat. No. 4,124,528, Nov. 7, 1978).

The gases most suitable for use in the present invention include inorganics such as carbon dioxide, argon, krypton, xenon, and nitrous oxide and mixtures thereof. Other gases such as hydrocarbons and halogenated hydrocarbons may degrade into hazardous by-products in high energy environments or pose fire and explosion hazards or are deleterious to the environment (i.e., air pollution) and humans and, therefore, are not suitable for use in the present invention. Preferably, the suitable gas or gas mixture is preconditioned to remove gaseous impurities such as hydrocarbons, moisture, and microscopic particulates having diameters of 0.2 micrometers or larger.

Figure 1:
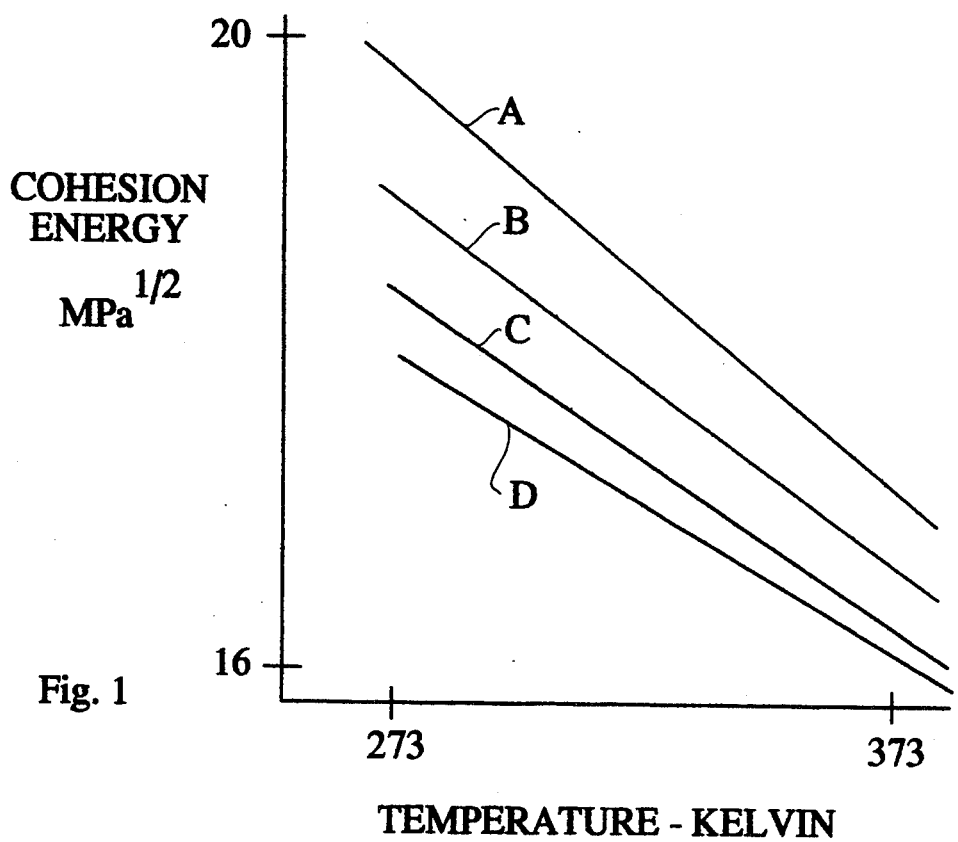
FIG. 1 presents a graph showing the microwave-induced temperature change on the cohesive energy content for various common contaminants, A-Acetone, B-Benzene, C-Toluene, and D-Xylene.

For the cleaning processes of the present invention, a dense fluid or dense fluid mixture is chosen to have and maintain an "averaged solubility chemistry" during microwave energizing that will be compatible with and most effective in dissolving, removing, transporting, or chemically degrading the irradiated residues. Solubility parameters or cohesive energy parameters are used in the present invention to provide a method of correlating and predicting the cohesive energy properties of contaminants, substrates, chemical agents (dense fluid additives or modifiers), and dense fluids and for predicting susceptibility to microwave energizing or activation. Cohesive energy parameters are used to predict the average solubility or solute carrying capacity and microwave field susceptibility of a dense fluid or dense fluid admixture for a particular contaminant or contaminants and maximum penetration effect of a dense fluid or dense fluid admixture for complex solid-state materials and to predict deposition or implantation characteristics for a given chemical agent or chemical agent mixture. Several computational methods exist for calculating cohesive energy values for substrates, chemical agents, and dense fluids (*HANDBOOK OF SOLUBILITY PARAMETERS AND OTHER COHESION PARAMETERS*, A. Barton, CRC Press, 1983). These include the Hildebrand, Hansen, and Giddings equations, among others. FIG. 1 shows the effect of microwave energizing upon several common contaminants. The isobars shown in FIG. 1 show change in cohesive energy, based on temperature change, for Acetone A, Benzene B, Toluene C, and Xylene D using the Hildebrand equation. Cohesive energy values for any substance can be computed using readily available vapor pressure data (K. L. Hoy, "New Values of the Solubility Parameters from Vapor Pressure Data", *JOURNAL OF PAINT TECHNOLOGY*, Volume 42, Number 541, February, 1970). Cohesive energy values for solid surfaces or materials with higher than liquid densities can be computed based upon readily available surface tension data (L. Jackson, "Surface Characterization Based on Solubility Parameters", *ADHESIVES AGE*, October, 1976).

In accordance with the first embodiment of the present invention, polar contaminants such as moisture, oils, and plasticizers are activated at a microwave energy frequency of 245 GHz via ionic conduction and rotational energy effects. Absorbed electromagnetic energy is transformed into kinetic energy, which is associated with a rise in temperature. Heat is transferred from the microwave-absorbing contaminants to the non-absorbing dense fluid, for example non-polar dense phase carbon dioxide. Contaminant characteristics such as permittivity and permeability, related to dielectric properties of the contaminant, determine the susceptibility of the contaminant to microwave energy. Large values for permittivity and permeability translate to high microwave activation.

Figure 2:
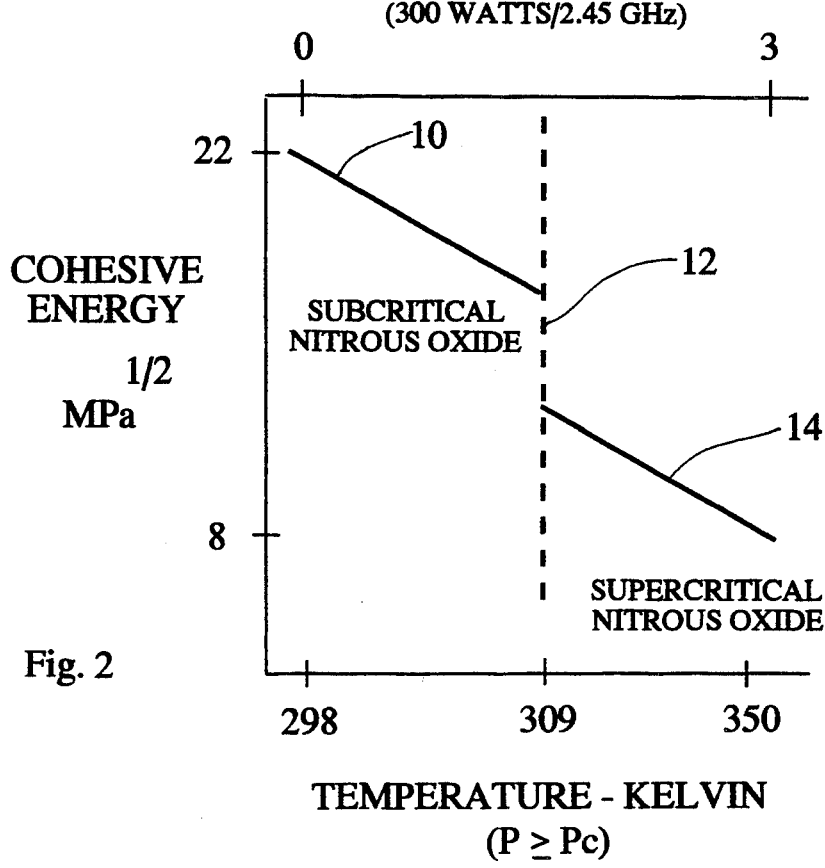
FIG. 2 is a graph showing the effect of a microwave energy field upon the cohesive energy content of dense phase nitrous oxide, a slightly polar dense fluid, at a constant pressure greater than or equal to the critical pressure for nitrous oxide.

Dense phase carbon dioxide is the preferred dense fluid for use in practicing the present process since it is non-toxic and inexpensive. Carbon dioxide is nonpolar and does not interact with (absorb) microwave radiation. However, dense fluid additives such as water, n-octyl alcohol, and nitrous oxide will absorb microwave energy, and can be used to modify the microwave absorption properties of the dense phase carbon dioxide cleaning solvent. The critical temperature of carbon dioxide is 305° Kelvin (°K.) (32° Celsius) and the critical pressure is 72.9 atmospheres (atm) (75 kilograms per square centimeter). The solute carrying capacity, or cleaning qualities of carbon dioxide can be modified by changing its physical and chemical makeup, while remaining at or above its critical pressure. Dense phase nitrous oxide has similar critical parameters and chemical properties of dense phase carbon dioxide, except that dense phase nitrous oxide exhibits polar characteristics. FIG. 2 shows a graph of the effects of microwave energizing upon dense phase nitrous oxide. As shown in FIG. 2, increasing the temperature of dense phase nitrous oxide from 298° K. (25 degrees celsius) to 350° K. (77 degrees celsius) at the critical pressure for nitrous oxide (71 atm) changes the dense fluid internal energy content from approximately 22 MPa$^{\frac{1}{2}}$ to approximately 8 Mpa$^{\frac{1}{2}}$. This energy change is accompanied by a change in dense fluid state 12, from subcritical state 10 to supercritical state 14, once the critical temperature of 309° K. (36 degrees celsius) is reached. This change in internal cohesive energy is accompanied by an overall change in the solubility properties (solvent spectrum) of dense phase nitrous oxide excluding hydrogen bonding contributions, of which dense phase nitrous oxide has none. In comparison, dense phase carbon dioxide does not interact with microwave radiation. Thusly, contaminants interact principally with microwave radiation and not dense phase carbon dioxide, providing for multi-phasing in regions of contaminant-dense phase carbon dioxide.

Our research has shown that supercritical or subcritical carbon dioxide is a poor solvent in some substrate cleaning applications. Thus, in accordance with the present invention, the dense fluid or dense fluid mixture (may be modified with polar and hydrogen bonding contributors such as purified water and nitrous oxide) is held at constant pressure and temperature to produce an average cohesion energy content (solute carrying capacity), whereas the substrate being processed and irradiated (pulsed or continuously) with microwave radiation to alter the solubility chemistry of the unwanted contaminants, which in turn alters the solubility chemistry of the localized dense fluid environment to effect separation of contaminant from the substrate. The action of the microwave radiation on the contaminant residues is as follows. Microwave radiation simultaneously produces a contaminant that is more soluble, based on temperature change, in the surrounding dense fluid in accordance with the Hildebrand solubility parameter equation Eq. 1.

Eq. 1:

$$\text{Solubility Parameter } (\delta) = \left( \frac{H^\beta - RT}{V} \right)^{\frac{1}{2}}$$

A spectrum of contaminant solvency is created through microwave energy induced solubility changes generated between regions of microwave-absorbing contaminant and non-absorbing localized dense fluid. A variety of contaminants differing in solubility chemistry are provided suitable localized solvent environments in a monophasic or multi-phasic dense fluid or dense fluid mixtures. A significant advantage of using microwave energy is the instantaneous on and off activation associated with electromagnetic radiation to produce localized heating only.

Alternatively, blends of xenon-carbon dioxide, argon-carbon dioxide, or nitrous oxide-carbon dioxide provide enhanced solute carrying capability by changing the solubility chemistry range hence contaminant or chemical agent selectivity range. For example, nitrous oxide is a slightly polar dense fluid that will absorb microwave energy. Mixtures of carbon dioxide and nitrous oxide may be used to produce multi-phasic dense fluid solvent environments during microwave irradiation. The nitrous oxide will absorb microwave energy and transfer that energy to carbon dioxide as heat.

Figure 3:
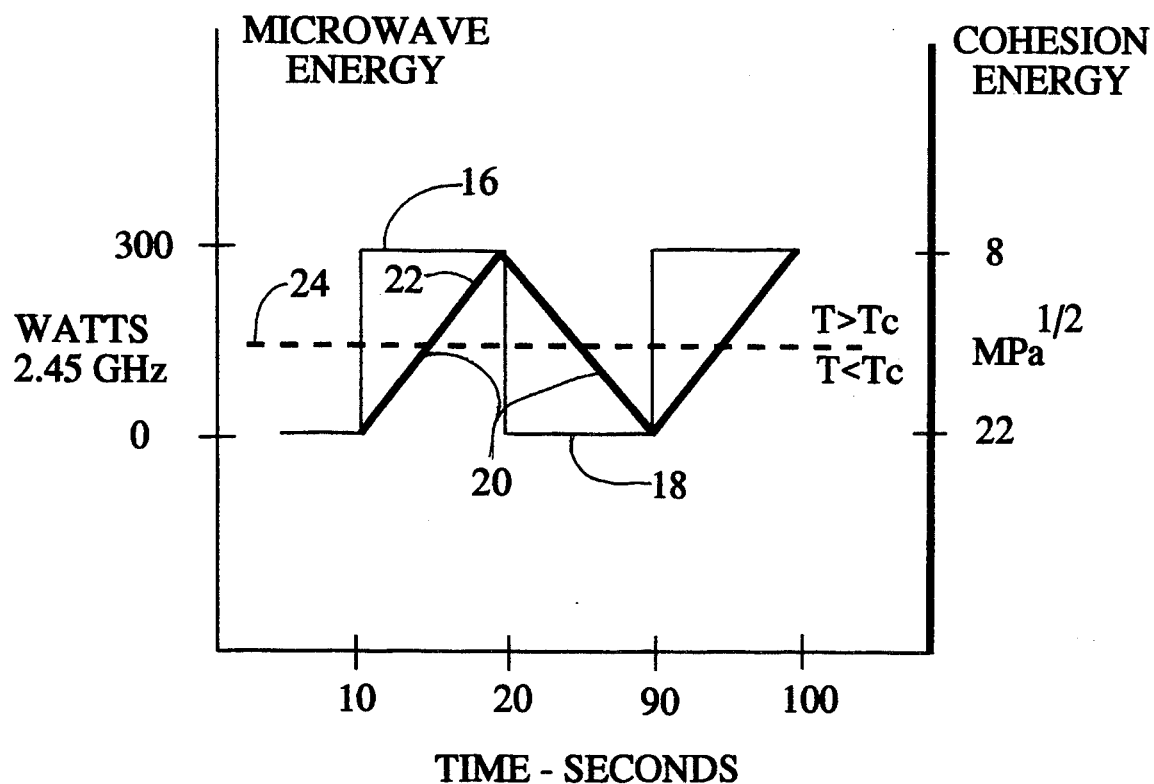
FIG. 3 is a graph illustrating the exemplary microwave energy pulsing sequence used to activate and alter the cohesion properties of contaminants and to produce localized dense phase gas multi-phasing in accordance with the present invention.

Microwave radiation for practicing the present invention can be provided by an either a fixed-tuned, mechanically-tuned, or electronically-tuned tube oscillator or Magnetron. A Magnetron converts electrical energy into electromagnetic radiation and can be adjusted or tuned to a range of radiation wavelengths. An exemplary Magnetron to provide microwave radiation for practicing the present invention operates at 2.45 GHz. A microwave generator is coaxially coupled with a power attenuator and tuner which is coupled with a microwave antenna or circular horn that emits the electromagnetic energy into a cleaning chamber containing the substrates with the contaminants to be activated. The microwave activation effect is illustrated in FIG. 3. As shown in FIG. 3, microwave irradiation of substrates in near-supercritical liquified carbon dioxide creates localized environments or zones of supercritical carbon dioxide. A localized solvent spectrum is created that undergoes a change in state 24 from subcritical state 20 to supercritical state 22 during microwave energizing 16 and back to liquid state 22 following heat transfer to the substrate and surrounding dense fluid environment. Multi-phasing is accomplished by pulsing microwave radiation as follows. The microwave generator is turned on 16 for several seconds and then it is turned off 18 for a time determined via internal cleaning chamber temperature and pressure measurements. By maintaining a relatively constant temperature or temperature gradient in the cleaning chamber, polar contaminants such as moisture, oils, plasticizers, and ionics are pulsed with microwave radiation. Pulsing (on and off) of microwave energy creates an internal cohesive energy pump that rapidly dissolves and transports unwanted interstitial or surface residues from substrates into the surrounding dense fluid. the localised phase change is accompanied by an overall cohesive energy change in excess of 10 MPa$^{\frac{1}{2}}$, as shown in FIG. 3.

Conventional applications of microwave include communication and therapeutic use (W. Stephen Cheung, "Microwave Principles and Applications", Artech House, 1985). Heating microwave radiation required for practicing the present invention can be produced using a variable power output (100 watts to 600 watts) Magnetron operating at 2.45 GHz, available from a variety of commercial dielectric heating system suppliers, which is transmitted into the cleaning chamber through a quartz window or through a coaxial antenna feedthrough. The power requirements for the microwave unit are based on the size of the cleaning chamber and desired energizing efficiency.

Microwave radiation is applied during specific substrate processing cycles of this invention to enhance solubilization of unwanted residues into surrounding dense fluid or dense fluid mixtures. During cleaning processes of the present invention, wide-range contaminant removal is accomplished via localized internal cohesive energy differentials created by the thermal action of microwave radiation on internal residues and subsequent heat transfer to surrounding dense fluid. Dense fluid/contaminant concentration and phase gradients created inside the substrate flow toward the outside where the dense fluid is low in solute (contaminant). This phenomenon can be described as an energy pump; similar to the phenomenon of outgassing and migration of contaminants under high temperature and vacuum conditions found in space (thermal gradients). In this regard, the present invention provides a process of cleaning or sterilizing substrates using an accelerated energy pump.

Thusly, in the first embodiment of the present invention, a dense fluid at nearsupercritical state (liquified gas or mixture of liquified gases and chemical agent admixtures) containing substrates having complex composition and geometry and one or more contaminants, is irradiated with microwave energy at a pressure equal to or above its critical pressure ($P_c$) and below its critical temperature ($T_c$). Dense gas molecules such as carbon dioxide and xenon and solid-state substrates such as fluorosilicone and polyester do not absorb microwave energy at 2.45 GHz Only unwanted contaminants such as moisture, monomers, and oily substances contained on or within the substrates are activated, raising local fluid temperature via molecular heat transfer (vibrational energy). Temperatures in these regions rise above the critical temperature, creating microenvironments of supercritical fluid. The heat in these regions is rapidly transferred to the surrounding liquified gas and reliquification of the dense fluid in these localized regions occurs. This heating and cooling of the dense fluid to form two phases simultaneously is called multi-phasing in the present invention. If microwave energy is continuously applied or pulsed with internal temperature control, a temperature gradient will form, extending radially from the center of the cleaning chamber containing the substrates and unwanted contaminants to ward the regions near the cleaning chamber wall containing subcritical fluids. The average dense fluid temperature can be controlled to any temperature, above or below the critical temperature, via control of dense fluid replenishment of the cleaning chamber with subcritical (cooled) dense fluid or through internal or external thermal control (heating/cooling units). Thus a wide range of solvent chemistries can be produced using microwave energy and one dense fluid or dense fluid mixtures.

Figure 4:
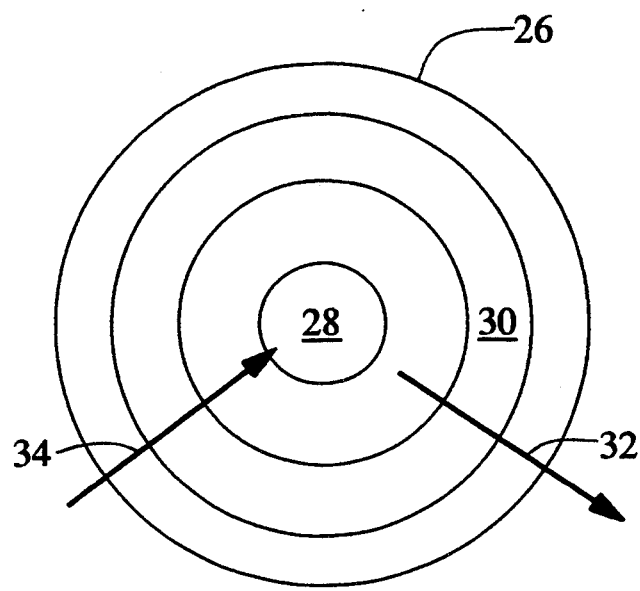
FIG. 4 is a force diagram used to illustrate the combined effects of microwave and centrifugal energy to separate contaminants from substrates.

In a second embodiment of the present invention, centrifugal energy is used in conjunction with cleaning processes of the present invention to further enhance cleaning by physically separating contaminated dense fluids contained in or on substrates from said substrates. Contaminants and contaminated dense fluids will separate according to density differences under the influence of centrifugal forces. Substrates contained at the center of the cleaning chamber remain stationary while mobile contaminants and contaminated dense fluids are forced outward during centrifugation toward the cleaning chamber walls. Centrifugal energy is accomplished in the present invention utilizing an internal cleaning chamber basket centrifuge operating at variable rotational speeds of between 10 and 800 revolutions per minute (11 to 880 times the force of gravity). Lower rotational speeds provide a means of mixing bulk substrates where mixing rather than centrifugal separation is more desirable. Higher rotational speeds, hence higher centrifugal force, are employed where high contaminant-substrate separation efficiency is required. Thusly, centrifugation provides for mixing and separation of substrates, contaminants, dense fluids, and dense fluid admixtures. FIG. 4 illustrates the synergistic separation effects of centrifugal and microwave energy forces. As shown in FIG. 4, the microwave energy force vector 34 influences contaminants contained on or within substrates positioned in the center of the cleaning chamber 28 which are contained in a basket centrifuge. High rotational velocities of the basket create a centrifugal force vector 32 influencing the migration of contaminants radially from the center 28 of the cleaning chamber toward the interior regions 30 of contaminated dense fluid and substrate and toward the cleaning chamber walls 26. The microwave and centrifugal forces work cooperatively to extract and separate contaminants from the substrate interstices. Additionally, depending upon the orientation of the cleaning chamber and basket centrifuge; vertical or horizontal, different mixing qualities are achieved. For example, a horizontal operating configuration allows substrates to tumble, and depending upon cleaning chamber temperature gradients present, allows substrates to contact subcritical dense fluid (lower half of cleaning chamber) and supercritical fluid (upper half of cleaning chamber) during each rotation.

In a third embodiment of the present invention, microwave radiation and centrifugal force are applied to substrates under negative pressure (vacuum) of approximately $1 \times 10^{-4}$ Torr following dense fluid cleaning processes. Substrates are centrifuged and pulse-irradiated as described in the above embodiments under conditions of vacuum to further enhance removal of residual volatile and non-volatile contaminants.

In a fourth embodiment, substrates are prepackaged in semi-permeable membranes, such as TYVEK (a product trademark of E.I. DuPont de Numbers Co.), and cleaned and sterilized in accordance with the processes of the present invention, as described in the above embodiments. Prepackaged substrates have extended shelf-life expectancies because they can be handled directly following cleaning and sterilization, and are ready for use upon opening, such as in surgical implant applications.

The necessary processing parameters: gas type, gas mixture ratios, microwave energy intensity, centrifuge speed, temperature and pressure, and exposure durations to achieve the desired cleanliness levels are dependent upon the nature and extent of contamination, the substrate configuration, and the quantity and volume of substrates being processed. These cleaning process parameters can be readily determined experimentally as follows. The substrate is subjected to the high-energy cleaning conditions in accordance with the present invention and then the material is subjected to destructive or non-destructive performance testing to determine the cleanliness level achieved. The substrate may be examined by visual to microscopic inspection or by other more extensive material cleanliness testing such as standard plate count, total mass loss, electrical conductivity, mechanical and thermal properties, toxicity testing, or chemical analysis. Alternatively, a witness specimen of similar composition and pre-packaged in a semi-permeable membrane may be subjected to various cleaning processing conditions and tested for cleanliness compliance. For example, a spore strip pre-packaged in TYVEK, available from American Scientific Co., Norwalk, Calif., containing millions of viable bacterial spores may be subjected to the processes according to the present invention and cultured to determine the effectiveness of the cleaning process conditions. From this data, the optimum cleaning process parameters may be determined.

With the aid of process computerization, these processing parameters are correlated with factors such as substrate composition to provide a processing library to assist the development of new substrate engineering applications and to provide consistent substrate processing. As an alternative to indirect performance testing as described above, direct in-line chemical analysis techniques such as supercritical fluid chromatography (SFC) may be used to examine dense fluid extracts from the cleaning chamber as an indicator of substrate cleanliness.

The substrate cleaning processes discussed above are accomplished in one continuous process, in accordance with the first, second, third, and fourth embodiments of the present invention. Due to the complexity of the operations involved in the process, computerization and automation are required to assure consistent substrate engineering. The processing sequences of this invention will be best understood by reference to the following detailed discussion of the cleaning system components and system integration. A detailed discussion of the exemplary processing sequence will follow.

Figure 5:
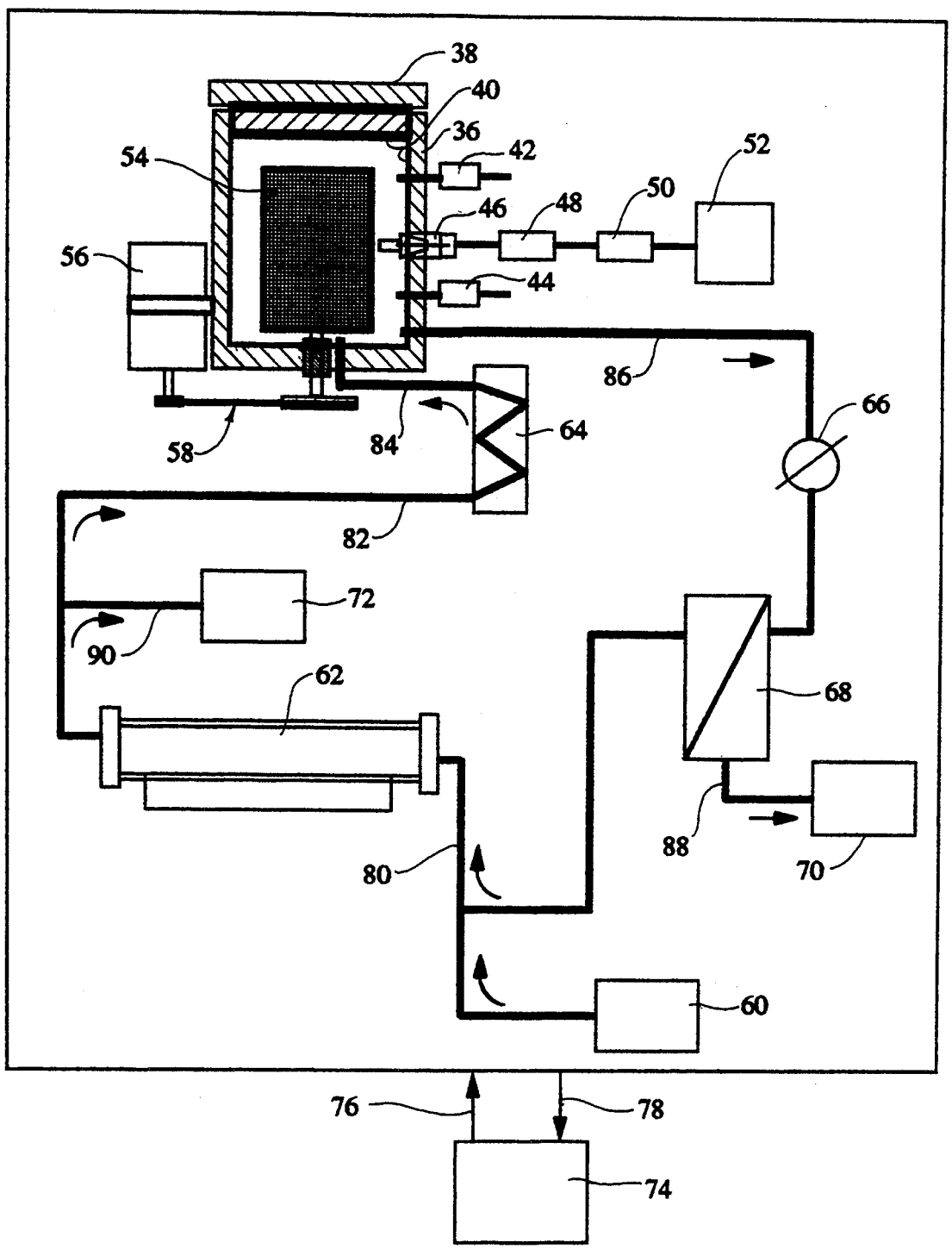
FIG. 5 is a schematic showing the major components and integration of the preferred dense phase gas microwave centrifuge cleaning system, including computerization, for use in accordance with the present invention.

An exemplary cleaning system, including computerization and major component integration, for practicing the present invention is shown diagrammatically in FIG. 5. As shown FIG. 5, the exemplary cleaning system for use in practicing the present invention includes cleaning chamber 36, chamber closure 38, and an inner non-conductive (anodized aluminum) microwave-reflecting liner 40. The interior of the cleaning chamber contains a centrifuge basket 54 which contains the substrates (not shown) to be cleaned. The chamber also includes, at a minimum, a temperature sensor 42 and pressure sensor 44. The centrifuge basket 54 is affixed to a shaft (not shown) which is fed through the cleaning chamber wall via a shaft feedthrough. The shaft feedthrough is connected to a pulley and belt system 58 which is connected to a variable speed motor 56. A coaxial microwave antenna feedthrough 46 is connected to a microwave tuner 48 and power controller 50, which is coupled to a microwave generator 52. A gas supply 60 consisting of one or more of the preferred gases and a gas preconditioning system (not shown) used for removing trace contaminants in the gas supply feeds a high pressure pump 62 via a connecting pipe 80. A connecting pipe 82 feeds dense fluid from the pump 62 to a heat exchanger 64. A connecting pipe 84 feeds cooled dense fluid into the substrate cleaning chamber 36. A connecting pipe 86 exhausts dense fluid containing contaminants from the cleaning chamber 36 through a pressure regulator 66 to a separation and recovery filter 68. Separated contaminants are fed via a connecting pipe 88 to a collection receiver 70. Cleaned dense fluid is fed via a connecting pipe 80 back to the pump 62. A connecting pipe 90 feeds reclaimed dense fluid into a collection receiver 72 for subsequent reuse. A high vacuum pump (not shown) is connected to the separation and recovery filter 68 for an alternative microwave-energized vacuum decontamination process of the present invention. These major system components are connected using various valves (not shown), pumps, and pipes as shown schematically in FIG. 5 to control and direct dense fluid flow, basket centrifuge rotation, cleaning chamber temperatures, and cleaning chamber pressures. Finally, the exemplary cleaning system with its network of valves, sensors, pumps, and high energy systems (microwave and basket centrifuge assembly) are integrated with a computer control system 74 using analog inputs 78 and digital control outputs 76 in combination with computer control software. Dense fluid energy calculations and substrate processing parameters in relation to the specific substrate end-product performance requirements are correlated and stored in computer software libraries to provide detailed and consistent material processing and would serve as a reference database for new substrate engineering applications.

Finally, the exemplary cleaning system as described above would preferably be housed and operated in an environmental control enclosure (not shown) to prevent re-contamination of biomedical substrates cleaned according to this invention.

Figure 6A:
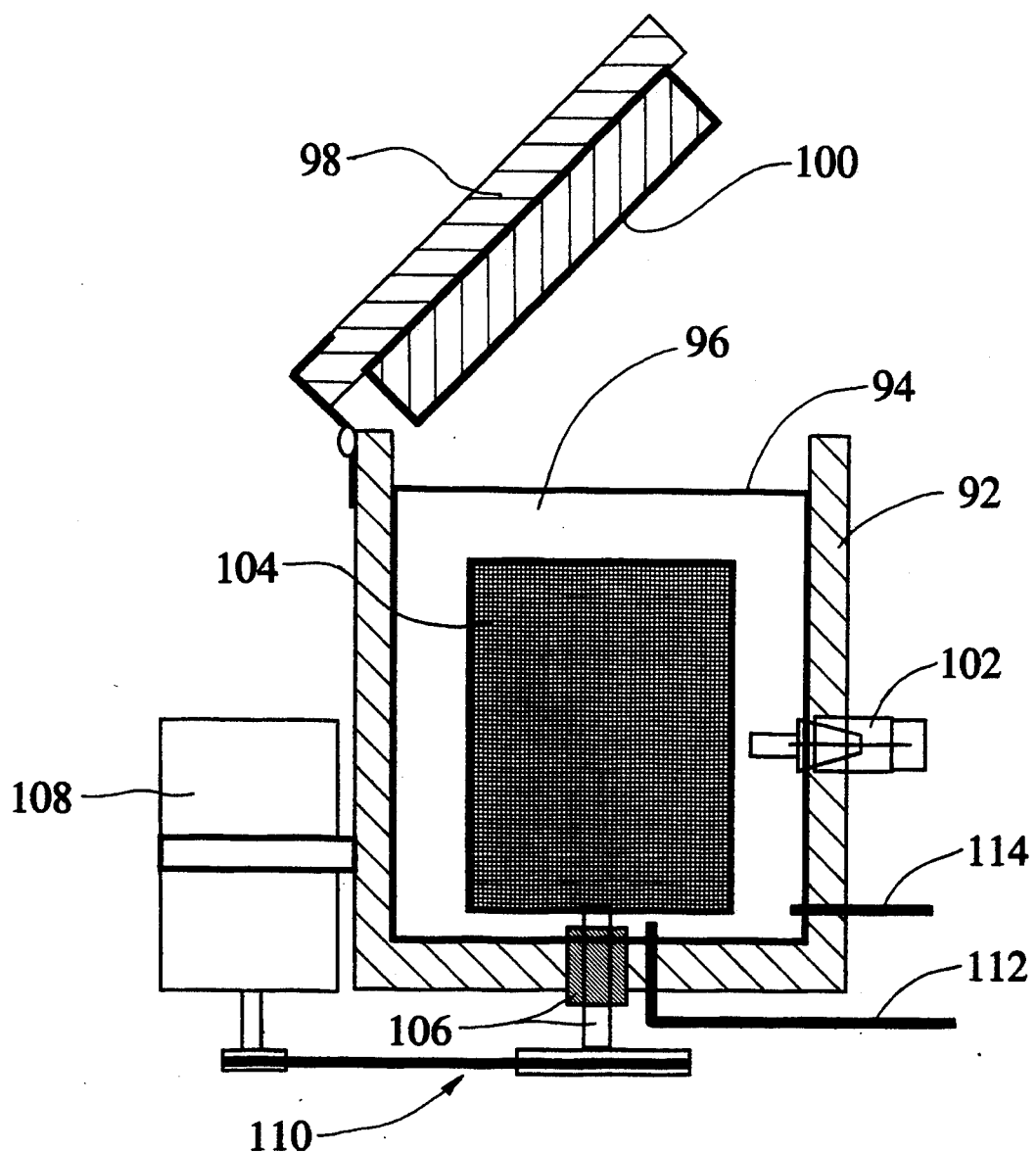
FIGS. 6A and 6B are partial sectional views of the preferred exemplary cleaning chamber and exemplary microwave radiation antenna feedthrough, respectively, shown with an exemplary basket centrifuge for use in accordance with the present invention.
Figure 6B:
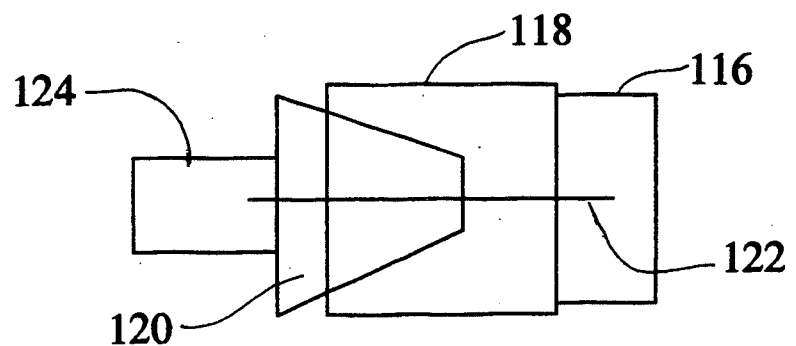

FIGS. 6A and 6B are detailed diagrams of an exemplary substrate cleaning chamber and microwave antenna feedthrough, respectively, for use in practicing the cleaning processes of the present invention. As shown in FIG. 6A, the cleaning chamber includes a chamber 92 and suitable chamber closure 98 with an internal non-conductive (microwave reflecting) inner chamber wall liner 94 and non-conductive interior liner cover 100 affixed to the exemplary chamber closure 98, providing a total microwave-reflecting inner cleaning chamber when the closure is in place. The interior liner and liner cover can be constructed out of aluminum and anodized to provide microwave-reflecting surfaces required to practice this invention. A basket centrifuge assembly to be used in accordance with the present invention consists of a variable speed motor 108 connected to a centrifuge shaft feedthrough 106 via a pulley/belt assembly 110. A centrifuge basket 104, used to contain substrates, is contained in the cleaning chamber interior 96 and is connected to the centrifuge shaft feedthrough assembly 106. The centrifuge basket constructed of TEFLON and VITON known as fluorinated plastics and sold by Du Pont slides over a centrifuge shaft (not shown), contained within the cleaning chamber, and is secured using a suitable locking pin (not shown). The exemplary cleaning chamber 92 is equipped with a coaxial microwave feedthrough 102 or a cylindrical or rectangular quartz window (not shown), to be used for introducing microwave radiation into the cleaning chamber 96. The cleaning chamber is equipped with a inlet dense fluid feed pipe 112 located near the center of the cleaning chamber and a contaminated dense fluid exhaust pipe 114 located on the outer chamber wall. FIG. 6B is an exemplary microwave antenna feedthrough for use in practicing the present invention. As shown in FIG. 6B, the exemplary microwave antenna consists of a coaxial connector 116, a threaded feedthrough 118 which screws into the cleaning chamber 92, FIG. 6A, a conical insulator 120, a microwave conductor 122, and a microwave antenna 124. An exemplary location and positioning of the exemplary microwave antenna is given in 102, FIG. 6A. The substrate cleaning chamber 92 and closure 98, FIG. 6A, used to seal substrates in the chamber during pressurization sequences, as well as all internally exposed high energy system components (microwave antenna), are composed of materials capable of withstanding the high energy, temperature, and pressure conditions of the present invention as well as chemically compatible with the suitable dense fluids, dense fluid admixtures, and chemical agents used to modify dense fluids or substrates.

The microwave radiation used in the present invention is generated by delivering a pulsed or continuous electromagnetic field via a microwave generator coupled with a coaxial feedthrough 102, FIG. 6A, or optionally, a quartz window passthrough (not shown) coupled to an external microwave generator and horn assembly. The internal chamber microwave-reflective liner 94 and liner closure 100, FIG. 6A, is constructed of anodized aluminum (non-conductive) which serves as a total internal microwave electromagnetic reflector. External cooling glands (not shown) are affixed to the lower hemisphere of the substrate cleaning chamber and heating glands (not shown) are affixed to the upper hemisphere of the substrate cleaning chamber, both using an array of thermoelectric coolers and heaters. These temperature control systems can be used in a horizontal basket centrifuge configuration to maintain a chamber wall temperature gradient from above the critical temperature (upper chamber hemisphere) to below the critical temperature (lower cleaning chamber hemisphere), similar to a vapor degreaser, during processing in accordance with the present invention.

Figure 7A:
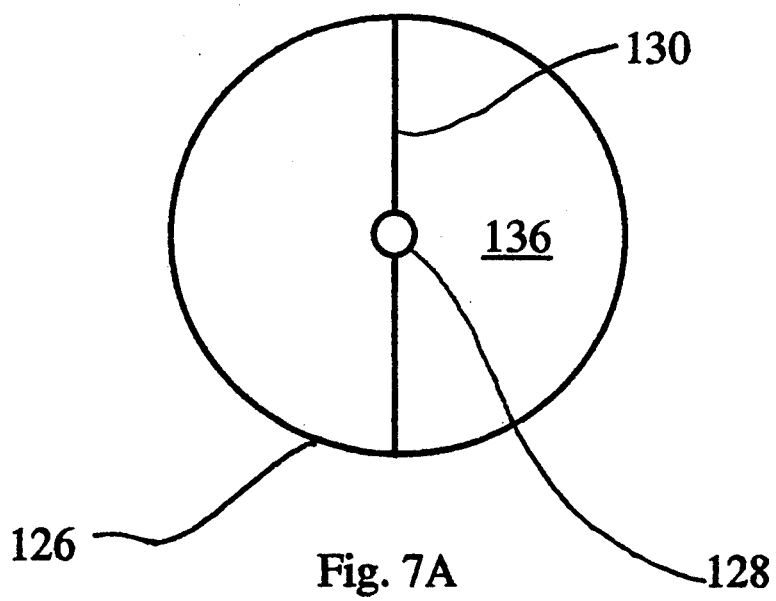
FIGS. 7A and 7B are partial sectional views of an exemplary removable centrifuge basket assembly used to contain, homogenize, microwave, and centrifuge bulk substrates cleaned in accordance with the present invention.
Figure 7B:
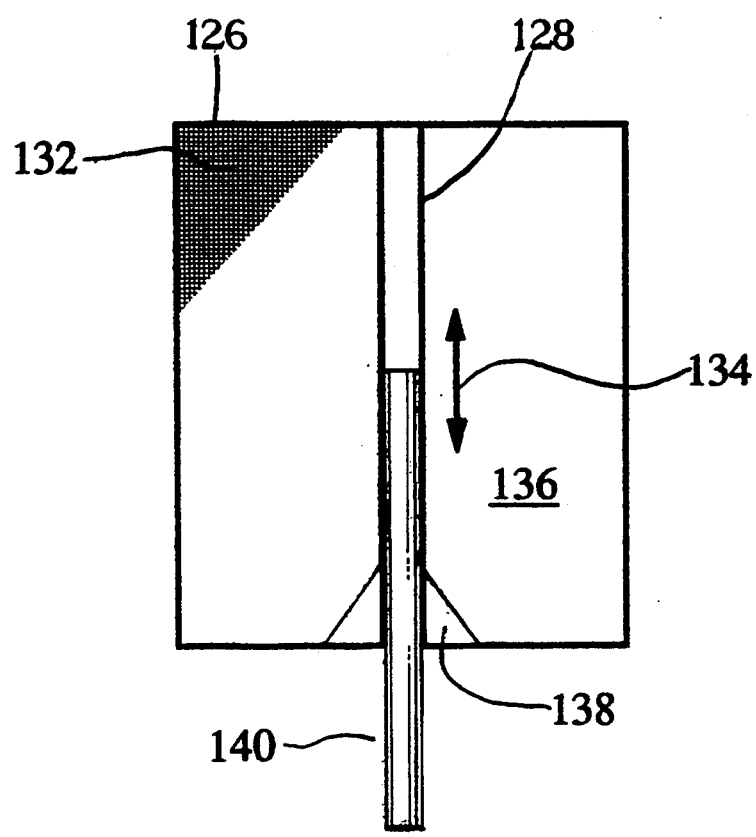

FIGS. 7A and 7B are partial sectional views of an exemplary centrifuge basket for loading, securing, tumbling or barreling or centrifuging, and unloading substrates in the exemplary substrate cleaning chamber discussed above. As shown in FIG. 7A (Top View), the exemplary basket includes an opening 136 to accommodate substrates and a structural support 130 to minimize basket wobble during high speed centrifugation. Also shown in this top view is a cylindrical sleeve 128 which slides down a centrifuge shaft (not shown) to allow the basket to be easily inserted or removed from the cleaning chamber (not shown). The exemplary basket shown in FIG. 7B (Side View), shows lower sleeve supports 138 which provide additional stability at high rotation speeds. FIG. 7B shows the up and down slide action 134 of the basket over an internal centrifuge shaft 140. Centrifuge basket components are designed to be non-obstructive and non-absorbing of the microwave energy and are meshed so that dense fluids flow into and out of the basket to contact the substrates. The center centrifuge shaft 140 is affixed to a variable speed motor and shaft in the exemplary cleaning chamber. It should be noted that many other centrifuge basket configurations can be developed to accommodate substrates having different geometric configurations. Baskets should be constructed out of materials which are chemically and physically compatible with the dense fluids, dense fluid-chemical agent admixtures, pressures, temperatures, high rotational forces, and high energy conditions present in this invention. The basket body 126 is constructed of composite materials and is meshed 132 to allow for dense fluid flow, un-attenuated penetration of microwave energy, and containment and mixing of substrates.

Having thus discussed the exemplary cleaning system components necessary for practicing the various embodiments of the present invention, the following is a detailed discussion of the exemplary cleaning sequence with appropriate references to the above discussed system components.

Figure 8:
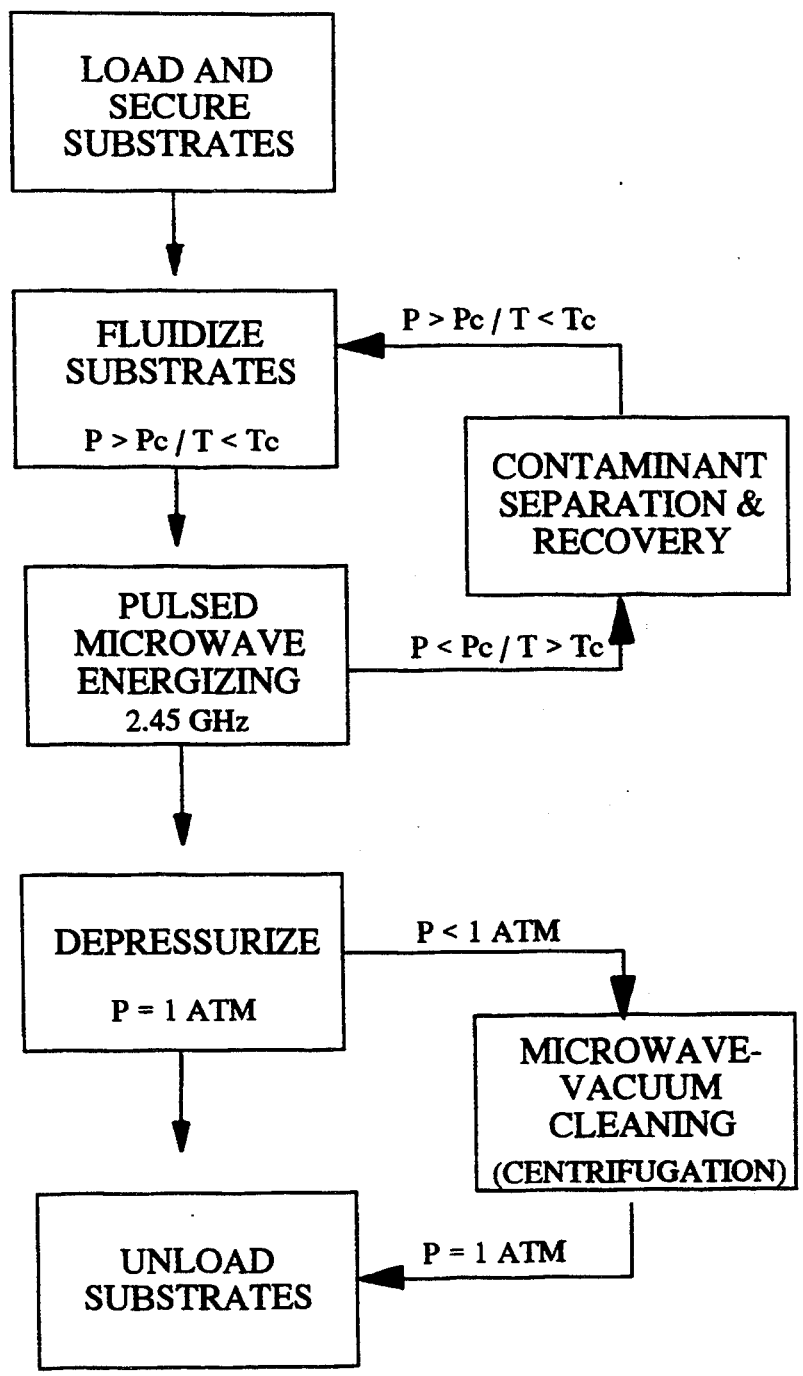
FIG. 8 is a flowchart setting forth an exemplary cleaning process, including an alternative microwave-vacuum cleaning process embodiment, in accordance with the present invention.

A flowchart showing the steps in the exemplary substrate cleaning process of the present invention is shown in FIG. 8. Device component references refer to FIGS. 5 and 6A. The process is carried out in the substrate cleaning chamber 96 which contains the substrates to be processed secured in the exemplary centrifuge basket 104. As shown in FIG. 8, substrates are first loaded and secured in the exemplary substrate cleaning chamber using the exemplary centrifuge basket, whereupon the chamber is sealed using a suitable chamber closure 98, purged for several minutes with inert gas such as nitrogen, and followed with a 2 to 3 minute purge with the selected processing gas such as carbon dioxide at a pressure of 10 to 100 atm, both via the injection pipe 112. Gas purging removes volatile impurities such as moisture in the chamber and pre-conditions the substrates prior to pressurization to the operating pressures at or above the critical pressure for the selected processing gas or gas mixture. Following purging cycles, the chamber is pressurized using a pressure pump 62 to the critical pressure with the selected processing gas or gas mixture supply 60 or reclaimed supply 72 at a temperature below the critical temperature of the dense gas or gas mixture, whereupon the substrates are bathed in dense fluid (fluidization). The substrates are then simultaneously subjected to the pulsed microwave energy cycles and centrifugal force, as described in this invention. During microwave and centrifugal cleaning, the internal substrate cleaning chamber temperature is held below the critical temperature for the dense fluid by continuously removing centrifuged dense fluid, containing contaminants removed from said substrates, from the cleaning chamber interior 96 via exhaust pipe 114 and returning the original (cleaned) filtered and cooled dense fluid back into the cleaning chamber via inlet pipe 112. The contaminated dense fluid is delivered to a separation and recovery filter 68 to separate contaminants from the dense fluid by dropping the pressure of the dense fluid to below the critical pressure using a regulator 66. The filtered dense fluid is repressurized and transferred back to the cleaning chamber 36 via pump 62 and delivery pipe 84, following the heat exchanger 64. The centrifuge basket 104 is rotated using the external motor 108, shaft 106, and belt-pulley apparatus 110 to provide rotational velocity. The substrates are centrifuged and microwaved continuously during dense gas recycling operations. The contaminants, for example machining oils, can be recovered from the separation and recovery filter 68 and captured in a receiver 70 for reuse or recycling. This cleaning process is repeated as required to attain the desired cleanliness level, based on predetermined performance testing or based upon data from in-line cleaning chamber dense fluid testing such as supercritical gas chromatography. Following the microwave-centrifugal cleaning sequence, the cleaning chamber is depressurized to ambient pressure (1 atm) and the cleaned substrates are removed from the chamber using the removable centrifuge basket. Alternatively, and in accordance with the third embodiment of the present invention and following microwave-centrifugal cleaning and depressurization operations, the cleaning chamber is depressurized to approximately 0.0001 Torr using a vacuum pump (not shown) connected to exhaust pipe 114. Pulsed microwave energy and centrifugal force are applied to facilitate removal of residual volatile contaminants under vacuum for several minutes.

In accordance with the fourth and final embodiment of the present invention, materials may be prepackaged in semi-permeable membranes such as TYVEK and cleaned in accordance with the processes described above. Prepackaged materials may be directly handled following microwave centrifuge cleaning operations without concerns for recontamination or, in the case of toxic or dangerous substrates, exposure to workers.

Examples of practice of the present invention are as follows.

EXAMPLE 1

This example illustrates the present invention to remove cutting oils from machined connector pins. Machined connector pins are contaminated with oils and machining soils which must be removed prior to subsequent electroplating operations. Liquified carbon dioxide is used in combination with electromagnetic and centrifugal energy cycles to precision clean and dry the connector pins. The dirty pins were loaded and secured in the cleaning chamber using the centrifuge basket assembly and purged with preconditioned carbon dioxide gas at 10 atm for several minutes. Following gas purging, the chamber was pressurized with carbon dioxide to 150 atm at approximately 25 degrees celsius. The centrifuge basket assembly was activated and rotated at a rate of 500 revolutions per minute causing the pins to centrifuge in the liquified gas solvent. The pins were allowed to contact the dense phase carbon dioxide in this manner for several minutes, during which microwave energy was pulsed at approximately 250 watts at 2.45 GHz over 10 second-on and 60 second-off intervals. During this operation, the dense fluid was continuously removed from the cleaning chamber, filtered to separate and recover machining oils (contaminants) removed from the pins, and returned to the cleaning chamber. The temperature of the dense phase carbon dioxide was held relatively constant, but always below the critical temperature. This entire process was continued for approximately 15 minutes. Following microwave centrifuge cleaning, the cleaning chamber was depressurized to ambient, the basket centrifuge was stopped, and the clean pins were removed from the cleaning chamber. The pins were visibly clean and showed no hydrocarbon contaminants. The oils recovered from the cleaning operation during continuous dense fluid recycling and contaminant separation processes were recovered and reused in subsequent pin machining processes.

EXAMPLE 2

This example illustrates the use of the cleaning processes of the present invention to clean titanium clips prepackaged in TYVEK semi-permeable membranes for use in attaching bone and tissue in surgical applications. A precision cleaning sequence identical to the process carried out in example 1 with a 2% v:v loading of hydrogen peroxide resulted in visibly clean titanium clips and a negative bacterial count based on results of a standard microbiological culturing test.

EXAMPLE 3

This example illustrates the use of cleaning processes of the present invention to decontaminate 1,1,1-trichloroethane contaminated textiles used to wipe down aerospace parts and equipment. In accordance with the cleaning processes of the present invention, a dense phase gas mixture consisting of 90%:10% by volume of carbon dioxide and nitrous oxide respectively was centrifuged and microwaved in several cycles at 150 atm and 34 celsius. The critical temperature for nitrous oxide is approximately 37 degrees celsius and 32 degrees celsius for carbon dioxide, therefore the contaminated textiles were centrifuged in a two-phase dense fluid cleaning mixture at approximately 500 rpm, whereupon the dense fluid cleaning mixture was continuously removed and recycled as in example 1. Following processing, the processed textiles were odor-free, dry, and reusable. The recovered solvent was reclaimable.

EXAMPLE 4

This example illustrates the use of cleaning processes of the present invention to prepare a silicone voice prosthesis for bioimplant utilization. A silicone voice prostheses was cleaned in a procedure identical to example 2 except that this cleaning sequence used a 95:5 by volume carbon dioxide/n-octyl alcohol mixture. Following cleaning process, the cleaning chamber was depressurized to $1 \times 10^{-4}$ torr and microwave energized to maintain an internal cleaning chamber temperature of approximately 60 degrees celsius for 60 minutes to remove n-octyl alcohol and other volatile residues from the prepackaged prosthesis. As in example 2, the centrifuge remained on during all phases of the cleaning sequence. Microbiological culturing tests on representative portions of the silicone prosthesis revealed no biological activity several weeks following the implant process.

EXAMPLE 5

This example illustrates the use of the cleaning process of the present invention to clean elastomeric compounds for use in high energy environments where substrate thermal outgassing or dielectric properties require significant performance improvement when compared to the original substrate (unclean) performance characteristics. A microwave centrifuge cleaning process identical to example 1 except that a 90:10 v:v mixture of liquid carbon dioxide and liquid nitrous oxide were used clean fluorosilicone-based interfacial seals used in connection devices. Following this, microwave-energized vacuum extraction processes were used as in example 4 and in accordance with the present invention to remove residual volatile materials. The cleaning chamber was then repressurized to ambient. The cleaned elastomers exhibited superior total mass loss and dielectric properties compared to the original unclean elastomers.

The processes of the present invention have numerous substrate cleaning applications. Compared to closest known art, this invention provides superior performance and substrate cleaning application. A wide variety of substrates can be prepared for biomedical, aerospace, and high energy environments where substrate cleanliness and end-product performance characteristics are a concern. Substrates include biomaterials, prostheses, precision and miniature valves, surgical textiles, surgical application aids, contaminated textiles, hazardous solid wastes, and botanical products, among others. The particular processing parameters employed using the processes herein will vary depending upon the nature of the substrate, the type of contaminants to be removed, and level and type of cleanliness desired. This process is well suited to preparing substrates having complex and intricate internal and external geometries, having many different construction materials, and bulk quantity.

Having thus described exemplary embodiments of the present invention, it should be noted by those skilled in the art that the within disclosures are exemplary only and that various other alternatives, adaptations, or modifications may be made within the scope of the present invention. Accordingly, the present invention is not limited to the specific embodiments as illustrated herein, but is only limited by the following claims.

What is claimed is:

1. A process for cleaning a substrate containing at least one contaminant, by placing said contaminated substrate in a centrifuge basket in a cleaning chamber, and by following the steps of:
   1) contacting said substrate containing said contaminant with a dense fluid at a pressure equal to or above the critical pressure and below the critical temperature of said dense fluid;
   2) continuously centrifuging said substrate in said basket;
   3) simultaneously subjecting said contaminant contained in said substrate and dense fluid to a high energy source of microwave energy at a frequency of 2.45 GHz;
   4) maintaining contact of said energized contaminant on said substrate for a predetermined period of time above the critical pressure and below critical temperature of said dense fluid, wherein a wide range of solvent environments are created wherein contaminant solubility and transport from said substrate is provided to thereby remove said contaminant from said substrate in one continuous process; and
   5) introducing a physical or chemical agent into the dense fluid by injection, solution, or reaction methods and contacting for a predetermined period of time in the dense fluid, in order to cause the precipitation, dissociation, dissolution, or activation of the physical or chemical contaminant in said substrate interstices; and
   6) subjecting said substrate to high vacuum (0.0001 Torr) to remove residual contaminants and excess chemical and physical agents.

2. The process as set forth in claim 1 wherein;
said microwave radiation is applied with internal temperature held below the critical temperature for the said dense fluid.

3. The process as set forth in claim 1 wherein:
said microwave energy field is derived from a combination of a microwave generator, microwave tuner, and microwave emitting antenna.

4. The process as set forth in claim 3 wherein:
said microwave energy field is transferred into the cleaning chamber using a microwave emitter coupled with a quartz window feedthrough in the cleaning chamber wall.

5. The process as set forth in claim 3 wherein:
transferring said microwave energy field into the cleaning chamber using a microwave emitter coupled with a coaxial feedthrough affixed to the cleaning chamber wall.

6. The process as set forth in claim 3 wherein:
applying said microwave energy field at 2.45 gigahertz.

7. The process as set forth in claim 3 wherein:

applying said microwave energy field between 100 and 1000 watts.

8. The process as set forth in claim 3 wherein:
pulsing said microwave energy between on and off states to continuously alter the cohesion energy of the contaminants and dense fluid contacting said contaminants.

9. The process as set forth in claim 3 wherein:
applying said microwave energy field under pressures of less than 1 atm to further enhance cleaning effectiveness.

10. The process as set forth in claim 1 wherein:
selecting said dense fluid from a group consisting of inorganic gases including carbon dioxide, nitrous oxide, krypton, xenon, argon, oxygen, helium, and nitrogen, and mixtures thereof.

11. The process as set forth in claim 10 wherein:
selecting said dense fluid from a mixture of carbon dioxide and nitrous oxide or other suitable dense fluid mixtures.

12. The process as set forth in claim 10 wherein:
mixing said dense fluid with chemical agents to improve dense fluid cleaning effectiveness.

13. The process as set forth in claim 1 wherein:
selecting said physical or chemical agent from a group consisting of dense fluids, organo-metallics, biocides, surfactants, alcohols, dyes, reductants, oxidizers, and odorants.

14. The process as set forth in claim 13 wherein:
said dense fluid chemical agent mixture consists of liquified carbon dioxide and hydrogen peroxide.

15. The process as set forth in claim 1 wherein:
introducing said physical or chemical agent to modify inherent material properties, including biocompatibility, long term residual sterility, and physical properties of said substrate, including attributes as chemical resistance, conductivity, outgassing or volatility, mechanical properties including wear resistance or strength, electrical resistance, or appearance, or odor.

16. The process as set forth in claim 1 wherein:
said substrate comprises material selected from a group consisting of metal, wood, rubber, polymers, ceramics, cellulose, textiles, hazardous solid waste, and inorganic materials and organic materials, including botanicals.

17. The process as set forth in claim 16 wherein:
selecting said substrate from a group consisting of complex substrates; prostheses, biomaterials, surgical aids, silicone voice prosthesis, titanium clip, solventladen textiles, and fluorosilicone rubber.

18. The process as set forth in claim 1 wherein:
selecting said contaminant from a group consisting of bacteria, spores, hydrocarbons, plasticizer, flavor oils, organo-metallics, and unreacted monomers.

19. The process as set forth in claim 18 wherein:
recovering and reusing said contaminant.

20. The process set forth in claim 1 wherein:
said substrate is processed within a controlled environment using an environmental control enclosure to prevent recontamination of substrate.

21. The process set forth in claim 1 wherein:
said substrate is prepackaged in semi-permeable membranes.

22. The process set forth in claim 1 wherein:
said substrate is centrifuged in a basket from 10 and 1000 revolutions per minute.

23. The process set forth in claim 22 wherein:
said basket is constructed from polypropylene, TEFLON, anodized aluminum, or VITRON.

24. The process set forth in claim 22 wherein:
said basket is constructed of materials that do not absorb microwave radiation.

25. The process set forth in claim 22 wherein:
said basket is centrifuged in a vertical orientation or horizontal orientation.

* * * * *